United States Patent
Thompson et al.

(10) Patent No.: US 10,041,014 B2
(45) Date of Patent: Aug. 7, 2018

(54) PROCESS, METHOD AND SYSTEM FOR REMOVAL OF MERCURY IN A GAS DEHYDRATION PROCESS

(71) Applicant: Chevron U.S.A. Inc., San Ramon, CA (US)

(72) Inventors: Joshua Allen Thompson, Martinez, CA (US); Daniel Chinn, Danville, CA (US); Evan Shigeto Hatakeyama, Richmond, CA (US); Ryan Oliver Owen, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/618,730

(22) Filed: Jun. 9, 2017

(65) Prior Publication Data

US 2017/0355920 A1   Dec. 14, 2017

Related U.S. Application Data

(60) Provisional application No. 62/348,200, filed on Jun. 10, 2016.

(51) Int. Cl.
*C10L 3/06* (2006.01)
*C10L 3/10* (2006.01)
(Continued)

(52) U.S. Cl.
CPC .......... *C10L 3/101* (2013.01); *B01D 53/1425* (2013.01); *B01D 53/1493* (2013.01); *B01D 53/263* (2013.01); *B01D 53/64* (2013.01); *B01D 53/77* (2013.01); *B01D 53/78* (2013.01); *B01D 53/96* (2013.01); *B01J 20/0237* (2013.01); *B01J 20/0285* (2013.01);
*B01J 20/08* (2013.01); *B01J 20/103* (2013.01); *B01J 20/12* (2013.01); *B01J 20/18* (2013.01); *B01J 20/20* (2013.01); *C10L 3/106* (2013.01); *B01D 2251/206* (2013.01); *B01D 2251/304* (2013.01); *B01D 2251/306* (2013.01); *B01D 2251/404* (2013.01); *B01D 2251/60* (2013.01); *B01D 2251/80* (2013.01); *B01D 2252/2023* (2013.01); *B01D 2252/2025* (2013.01); *B01D 2252/606* (2013.01);
(Continued)

(58) Field of Classification Search
CPC .... C10L 3/06; C10L 3/10; C10L 3/101; C10L 3/106
See application file for complete search history.

(56) References Cited

U.S. PATENT DOCUMENTS 3,594,985 A * 7/1971 Ameen .............. B01D 53/1468
95/163
4,421,535 A * 12/1983 Mehra ....................... C07C 7/11
62/625
(Continued)

FOREIGN PATENT DOCUMENTS

DE   10 2007 047 765   * 4/2009 ................ C10L 3/10

*Primary Examiner* — Timothy C Vanoy
(74) *Attorney, Agent, or Firm* — Howard V. Owens (57) ABSTRACT

A process for removal of mercury in a gas dehydration system comprising (a) adding a complexing agent to a recirculated glycol solvent as part of the glycol solution feed prior to or at the dehydration liquid contactor and recirculating continuously with the glycol solvent, (b) selectively reacting the complexing agent with mercury in the wet natural gas to remove the mercury from the dry natural gas product, (c) and feeding the rich glycol with the complexing agent to a regenerator and continuously regenerating.

9 Claims, 5 Drawing Sheets

(51) Int. Cl.
  *B01D 53/14* (2006.01)
  *B01D 53/64* (2006.01)
  *B01D 53/78* (2006.01)
  *B01J 20/02* (2006.01)
  *B01J 20/08* (2006.01)
  *B01J 20/10* (2006.01)
  *B01J 20/12* (2006.01)
  *B01J 20/18* (2006.01)
  *B01J 20/20* (2006.01)
  *B01D 53/26* (2006.01)
  *B01D 53/77* (2006.01)
  *B01D 53/96* (2006.01)

(52) U.S. Cl.
  CPC ... *B01D 2252/608* (2013.01); *B01D 2256/245* (2013.01); *B01D 2257/602* (2013.01); *C10L 2290/542* (2013.01)

(56) References Cited

U.S. PATENT DOCUMENTS

| | | | | |
|---|---|---|---|---|
| 5,248,488 | A * | 9/1993 | Yan | C07C 7/005 423/210 |
| 6,475,451 | B1 * | 11/2002 | Leppin | B01D 53/64 423/210 |
| 7,476,365 | B2 * | 1/2009 | Al-Faqeer | B01D 53/002 422/169 |
| 8,598,072 | B2 * | 12/2013 | Sato | B01D 15/00 502/413 |
| 8,790,427 | B2 * | 7/2014 | O'Rear | B01D 53/1493 423/210 |
| 8,840,691 | B2 * | 9/2014 | Cooper | B01D 53/1493 423/210 |
| 9,023,123 | B2 | 5/2015 | O'Rear et al. | |
| 2012/0047943 | A1 * | 3/2012 | Barclay | C10L 3/10 62/613 |

* cited by examiner

FIG. 5

PROCESS, METHOD AND SYSTEM FOR REMOVAL OF MERCURY IN A GAS DEHYDRATION PROCESS

BACKGROUND OF THE INVENTION

Figure 1:
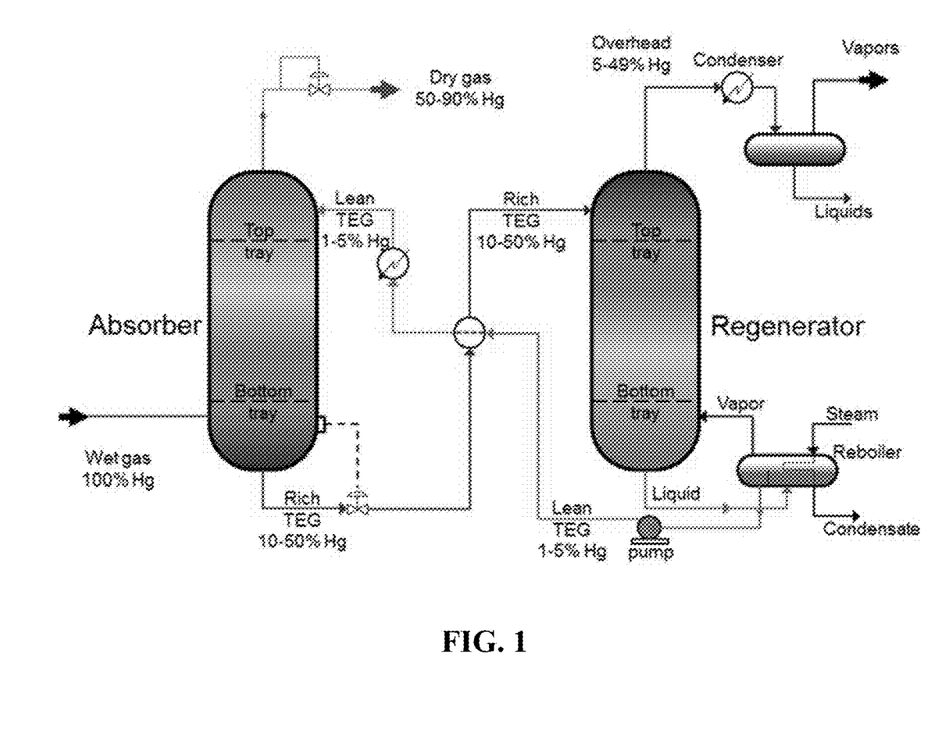
FIG. 1 is a diagram of a typical glycol dehydration process and system.

In a typical gas processing plant or in a typical offshore gas dehydration system, mercury-containing natural gas is fed to a glycol dehydration system as shown in attached FIG. 1. The natural gas, which is saturated with water and contains some amount of mercury, is contacted with a glycol solvent containing between 97-99.5 wt % glycol and 0.5-3 wt % water in a pressurized liquid contactor, flowing counter currently between the gas and liquid. In this instance, mercury is absorbed by the glycol solvent and between 10 and 50% of mercury is removed in the pressurized liquid contactor. The liquid contactor can be composed of tray columns or packed columns. The glycol solvent, now containing an increased amount of water and mercury, is known as the rich glycol solvent. This rich glycol is depressurized by flashing the pressurized liquid through an expansion valve. The rich glycol solvent is heated and sent to the top of a regenerator. The glycol is regenerated in the regenerator which operates at the top of the tower between 90 and 110 degrees Celcius and at the bottom in a reboiler which operates between 190 and 205 degrees Celcius. The regenerated, or lean, glycol is cooled and then recirculated through a pumping system back to the liquid contactor. The overhead of the regenerator contains water and mercury vapor.

SUMMARY OF THE INVENTION

An embodiment of the invention is a process wherein a complexing agent is added to a recirculated glycol solvent as part of the glycol solution feed to the dehydration liquid contactor and recirculated continuously with the glycol solvent. The complexing agent selectively reacts with mercury in the wet natural gas to remove the mercury from the dry natural gas product. The rich glycol with the complexing agent is fed to the regenerator and continuously regenerated. The overhead of the regenerator containing water and mercury vapor is contacted with an adsorbent that captures mercury, using an adsorbent such as an activated carbon, alumina, silica, zeolite or supported metal.

In another embodiment of the invention a complexing agent is added continuously prior to the liquid contactor. Inside the liquid contactor, the complexing agent dissolved in the lean glycol solvent selectively reacts with the mercury in the natural gas, producing a rich glycol solvent containing mercury. The rich glycol solvent is then sent to an adsorber where mercury and the complexing agent are removed using an adsorbent, such as an activated carbon, ion-exchange resin, alumina, silica, zeolite or supported metal. The rich glycol with reduced complexing agent and no mercury is then fed to the regenerator to remove water in the overhead and regenerate the glycol solvent.

In a further embodiment of the invention a complexing agent is added continuously prior to the liquid contactor. Inside the liquid contactor, the complexing agent dissolved in the lean glycol solvent selectively reacts with the mercury in the natural gas, producing a rich glycol solvent containing mercury. A filter aid is then added after the liquid contactor, but prior to the expansion valve. This filter aid allows for the filtration of the complexing agent with mercury and the filter aid. The filtration may be performed using a mechanical filter, carbon filter, ultrafiltration filter or nanofiltration filter. The rich glycol with reduced complexing agent and no mercury is then fed to the regenerator to remove water in the overhead and regenerate the glycol solvent.

DETAILED DESCRIPTION OF THE INVENTION

"Volatile mercury" refers to mercury that is present in the gas phase of well gas or natural gas. Volatile mercury is primarily elemental mercury (Hg0) but may also include some other mercury compounds (organic and inorganic mercury species).

"Wet gas" refers to natural gas that contains less methane (e.g., less than 85%) and more ethane and other more complex hydrocarbons or refers to natural gas that is saturated with water vapor.

"Acid gas" refers to the product gas from an amine unit that contains acidic impurities, e.g., H2S, CO2, SO2 and SO2 (SOx), NO and NO2 (NO2), chlorine, etc. In one embodiment, the acid gas is chemically absorbed in the liquid (solution or fluid). In another embodiment, the acid gas is dissolved in the liquid, e.g., an aqueous amine solution.

The "complexing agent" refers to a material or compound capable of reacting with volatile mercury in natural gas after absorbing in the glycol solvent, forming a non-volatile mercury complex. Complexing agents include but are not limited to water-soluble sulfur, such as sulfides, hydrosulfides, thiocarbamates, and inorganic polysulfides. Other examples of the complexing agent includes mercaptans, organic polysulfides, organic thiocarbamates, thiourea, sulfur-containing polymers, and sulfanes. Acid gases may be present and the complexing agent is still able to functionally remove the volatile mercury and convert to non-volatile mercury.

Examples of complexing agents include but are not limited to water-soluble sulfur species, e.g., sulfides, hydrosulfides, and polysulfides, for extracting mercury in natural gas into the aqueous phase as precipitate (e.g., HgS) or soluble mercury sulfur compounds (e.g. HgS22-). Examples of water-soluble sulfur compounds include ammonium polysulfide, sodium polysulfide, potassium polysulfide, calcium polysulfide, sodium hydrosulfide, potassium hydrosulfide, ammonium hydrosulfide, sodium sulfide, potassium sulfide, calcium sulfide, magnesium sulfide, ammonium sulfide, sodium thiocarbamate, sodium dithiocarbamate, ammonium thiocarbamate, ammonium dithiocarbamate, and mixtures thereof. Aqueous source containing water-soluble sulfur species can be any of purchased or produced reagent solutions, sulfidic water, sulfidic waste water, kraft caustic liquor, kraft carbonate liquor, etc.

Other examples of complexing agents that can be used for the removal of mercury from the glycol unit includes mercaptans, organic polysulfides (compounds of the general formula R-Sx-R' where x is greater than 1 and R and R' are alkyl or aryl groups), organic thiocarbamates, thiourea, sulfur-containing polymers, sulfanes and combinations thereof.

Examples of non-volatile mercury complexes include HgS and soluble mercury-sulfur materials, such as HgSx2-. Volatile mercury refers to mercury in the gas phase and is primarily elemental mercury (Hg0).

Examples of the filter aid used in one embodiment include inorganic polysulfides, sulfides, thiocarbamates, organic polysulfides, metal sulfides, such as Cu(I)2S, Cu(II)S, and MoS, hydrosulfides, and thiol-containing polymers.

Examples of the glycol solvent include triethylene glycol and tetraethylene glycol, containing between 97 and 99.9 wt % of glycol in the lean glycol solvent.

The amount of complexing agents to be added to the glycol solution is determined by the effectiveness of complexing agent employed. The amount is at least equal to the amount of mercury in the gas on a molar basis (1:1), if not in an excess amount. In one embodiment, the molar ratio ranges from 5:1 to 10,000:1. In another embodiment, from 10:1 to 5000:1. In yet another embodiment, a molar ratio of sulfur additive to mercury ranging from 50:1 to 2500:1. In one embodiment with the use of a water-soluble sulfur compound as a scrubbing agent, a sufficient amount of the complexing agent is added to the glycol contactor for a sulfide concentration ranging from 0.05 M to 10M in one embodiment; from 0.1M to 5M in a second embodiment; from 0.3M to 4M in a third embodiment; and at least 0.5M in a fourth embodiment. If the mercury complexing agent is an organic polysulfide, sulfane or mercaptan, the moles of complexing agent are calculated on the same basis as the amount of sulfur present.

In one embodiment, the complexing agent is an inorganic polysulfide such as sodium polysulfide, for an extraction of mercury from the natural gas according to equation: Hg (g)+Na2Sx (aq)+$H_2O$->HgS2H-(aq)+Na2Sx-2 (aq)+OH- (aq), where (g) denotes the mercury in the gas phase, and (aq) denotes a species in water. The charges are balanced by other species. Solid HgS is not formed and the mercury remains in solution as an anionic species. In another embodiment, the complexing agent is a compound with a relatively high boiling point, e.g., not too volatile and above 100° C. in one embodiment and above 125° C. in another embodiment. If not, the complexing agent would be lost in the stripping operation for the removal of adsorbed water from the rich glycol solution. In yet another embodiment the complexing agent is sodium sulfide. Sodium sulfide and other complexing agents may promote the removal of mercury from gas streams containing high CO2 concentrations but low H2S concentrations. In yet another embodiment the complexing agent is hydrogen sulfide (H2S) or a combination of hydrogen sulfide and one or more of the above-mentioned complexing agents.

An embodiment of the invention is a process wherein a complexing agent is added to a recirculated glycol solvent as part of the glycol solution feed to the dehydration liquid contactor and recirculated continuously with the glycol solvent. The complexing agent selectively reacts with mercury in the wet natural gas to remove the mercury from the dry natural gas product. The rich glycol with the complexing agent is fed to the regenerator and continuously regenerated. The overhead of the regenerator containing water and mercury vapor is contacted with an adsorbent that captures mercury, using an adsorbent such as an activated carbon, alumina, silica, zeolite or supported metal.

In another embodiment of the invention, a stripping gas is used in the regenerator to increase the removal of both mercury and water from the recirculated glycol solution. This stripping gas with mercury vapor is then used as a carrier for the mercury vapor that is contacted with an adsorbent in the overhead section of the regenerator. In one embodiment, the stripping gas source is a slipstream of the dried natural gas from the glycol contactor. In another embodiment, the stripping gas is a dry gas stream, containing nitrogen.

In another embodiment of the invention a complexing agent is added continuously prior to the liquid contactor. Inside the liquid contactor, the complexing agent dissolved in the lean glycol solvent selectively reacts with the mercury in the natural gas, producing a rich glycol solvent containing mercury. The rich glycol solvent is then sent to an adsorber where mercury and the complexing agent are removed using an adsorbent, such as an activated carbon, ion-exchange resin, alumina, silica, zeolite or supported metal. The rich glycol with reduced complexing agent and no mercury is then fed to the regenerator to remove water in the overhead and regenerate the glycol solvent.

In a further embodiment of the invention a complexing agent is added continuously prior to the liquid contactor. Inside the liquid contactor, the complexing agent dissolved in the lean glycol solvent selectively reacts with the mercury in the natural gas, producing a rich glycol solvent containing mercury. A filter aid is then added after the liquid contactor, but prior to the expansion valve. This filter aid allows for the filtration of the complexing agent with mercury and the filter aid. The filtration may be performed using a mechanical filter, carbon filter, ultrafiltration filter or nanofiltration filter. The rich glycol with reduced complexing agent and no mercury is then fed to the regenerator to remove water in the overhead and regenerate the glycol solvent.

In one embodiment, the complexing agent is added to the the contactor (dehydrator), allowing the extraction of volatile mercury from the wet gas feed into the glycol solution, for a dehydrated gas stream having a reduced concentration of water vapor as well as a mercury concentration of less than 50% of the mercury originally present in one embodiment (at least 50% mercury removal). In another embodiment, the sweetened gas contains less than 10% of the original mercury level (at least 90% removal). In a third embodiment, less than 5% of the original level (at least 95% removal). The mercury content in the dehydrated gas stream will depend on the mercury content of the feed, the percent removal, and the lean glycol recirculation rate. The mercury content is reduced to below 100 µg/Nm3 in one embodiment, less than 10 µg/Nm3 in a second embodiment, less than 1 µg/Nm3 in a third embodiment, and less than 0.1 µg/Nm3 in a fourth embodiment.

Optional additives: In one embodiment in addition to the complexing agent, at least one of an anti-foam and/or a demulsifier is added to the glycol solution. As used herein, the term anti-foam includes both anti-foam and defoamer materials, for preventing foam from happening and/or reducing the extent of foaming. Additionally, some anti-foam material may have both functions, e.g., reducing/mitigating foaming under certain conditions, and preventing foam from happening under other operating conditions. Anti-foam agents can be selected from a wide range of commercially available products such as silicones, e.g., polydimethyl siloxane (PDMS), polydiphenyl siloxane, fluorinated siloxane, etc., in an amount of 1 to 500 ppm.

In one embodiment, at least a demulsifier is added in a concentration from 1 to 5,000 ppm. In another embodiment, a demulsifier is added at a concentration from 10 to 500 ppm. In one embodiment, the demulsifier is a commercially available demulsifier selected from polyamines, polyamidoamines, polyimines, condensates of o-toluidine and formaldehyde, quaternary ammonium compounds and ionic surfactants. In another embodiment, the demulsifier is selected from the group of polyoxyethylene alkyl phenols, their sulphonates and sodium sulphonates thereof. In another embodiment, the demulsifier is a polynuclear, aromatic sulfonic acid additive.

In another embodiment, in addition to the complexing agent and optionally at least a demulsifier/anti-foam agent, an oxygen scavenger is preferably added to any of the glycol solution and the absorbent. The oxygen scavenger may be present in an amount ranging from 0.001 to 1 wt. %, based on the weight of the glycol solution, or absorbent. As dissolved oxygen in the glycol storage tank would lead to corrosion of iron surfaces, or react with the feed gas making heat stable salts which are difficult to separate in the regeneration step, the oxygen scavenger removes traces of dissolved oxygen present, minimizing corrosion impact.

Examples of oxygen scavengers include bisulfites, metabisulfites, hydrazine salts, hydroxylamine salts, guanidine salts, N,N-Diethylhydroxylamine, oximes, dithionites, ascorbic acid, and isoascorbic acid. The anion salts of these oxygen scavengers can be chlorides, sulfates, and other suitable anions. The cations associated with the oxygen scavengers can be sodium, potassium or volatile cations as described for the complexing agents.

A compatible oxygen scavenger is one that does not react with the mercury complexing agent and reduce its effectiveness for mercury capture. Examples of oxygen scavengers that react with a complexing agent such as polysulfide include bisulfites and metabisulfite. In one embodiment, the oxygen scavenger is selected for compatibility with the mercury complexing agent. Examples of compatible oxygen scavengers include: hydrazine salts, guanidine salts, N,N-Diethylhydroxylamine, oximes, dithionites, ascorbic acid, and isoascorbic acid.

EXAMPLES

The following examples are given to illustrate the present invention. It should be understood, however, that the invention is not limited to the specific conditions or details described in these examples.

Example 1

In a three-neck flask with a Teflon stirrer (a glass reactor), 200 mL of solution of stannous chloride and sulfuric acid were prepared and heated to 70 degrees Celsius with a concentration of 10 wt % stannous chloride and 5 wt % sulfuric acid. When volatile mercury was to be generated, 1.0 mL of 200 ppm Hg solution of mercuric chloride in deionized water was injected into the reactor via a septum. The stannous chloride rapidly reduced the ionic mercury to elemental mercury. In the glass reactor, a gas line with 200 cc/min of either nitrogen or carbon dioxide bubbled through the acidic solution. This gas was used to carry the elemental mercury to the downstream absorbers for absorption removal.

The glass reactor was connected to two absorbers in series, each of which contained 200 mL of solution. The absorbers were equipped with a glass frit to produce small bubbles. The contact time inside both absorbers was approximately one second between a gas bubble and the surrounding solvent. The second absorber contained either 3 wt % sodium polysulfide in the case of when nitrogen was used as a carrier gas or 1 wt % 12 in white oil in the case of when carbon dioxide was used as a carrier gas. The second absorber was used as a scrubber to remove any traces of elemental mercury not absorbed in the first absorber.

Samples of liquids in the reactor and the two absorbers and gas leaving the reactor were drawn at periodic intervals over a 1 hour to a 3-hour period and analyzed for mercury by a Lumex detector. Mercury balances were checked to be within 95% or more to be used in analysis. After a typical reaction time of 1 hour to 3 hours, the ionic mercury is converted to elemental mercury and removed from the reactor by the carrier gas by an average conversion of 90-99%.

The efficiency of the complexing agents are evaluated by the mercury mass balance in the two absorbers and the improvement in mercury taken up in the first absorber compared to a case when no additive is used in the glycol solvent. This allows deduction of the process performance improvement over the glycol solvent in a pressurized liquid contactor. It is expected that a proportional increase in solubility of volatile mercury in the rich glycol solvent will result from the proportional improvement of the efficiency for mercury when a complexing agent is used.

Examples 2-8

These experiments are used to evaluate the efficiency improvement of sodium polysulfide as a complexing agent under various process conditions. Sodium polysulfide is highly effective in improving the efficiency for volatile mercury removal in the first absorber containing triethylene glycol (TEG). Sodium polysulfide was added in varying amounts with different process conditions as listed in attached Table 1. Although it is expected that the presence of carbon dioxide would cause a destablization in aqueous sodium polysulfide solutions due to a drop in the pH of the solution, the glycol solvent containing sodium polysulfide in the presence of a carbon dioxide carrier gas did not produce any precipitation of elemental sulfur. There is a lower mercury removal efficiency in the presence of acidic gases, but the complexing agent is still able to effectively capture mercury compared to no addition of a complexing agent.

TABLE 1

| Examples 2-8 | | | | |
|---|---|---|---|---|
| Example | Solvent | ppm Na2Sx | S/Hg Molar Ratio | Efficiency |
| 2 | TEG | 0 | N/A | <1 |
| 3 | TEG | 14 | 88 | 13.5 |
| 4 | TEG | 140 | 880 | 40.2 |
| 5 | TEG | 1400 | 8800 | 98.4 |
| 6 | TEG | 14 | 88 | 15.2 |
| 7 | TEG | 140 | 880 | 24.9 |
| 8 | TEG | 1400 | 8800 | 71.4 |

Example 9

Figure 2:
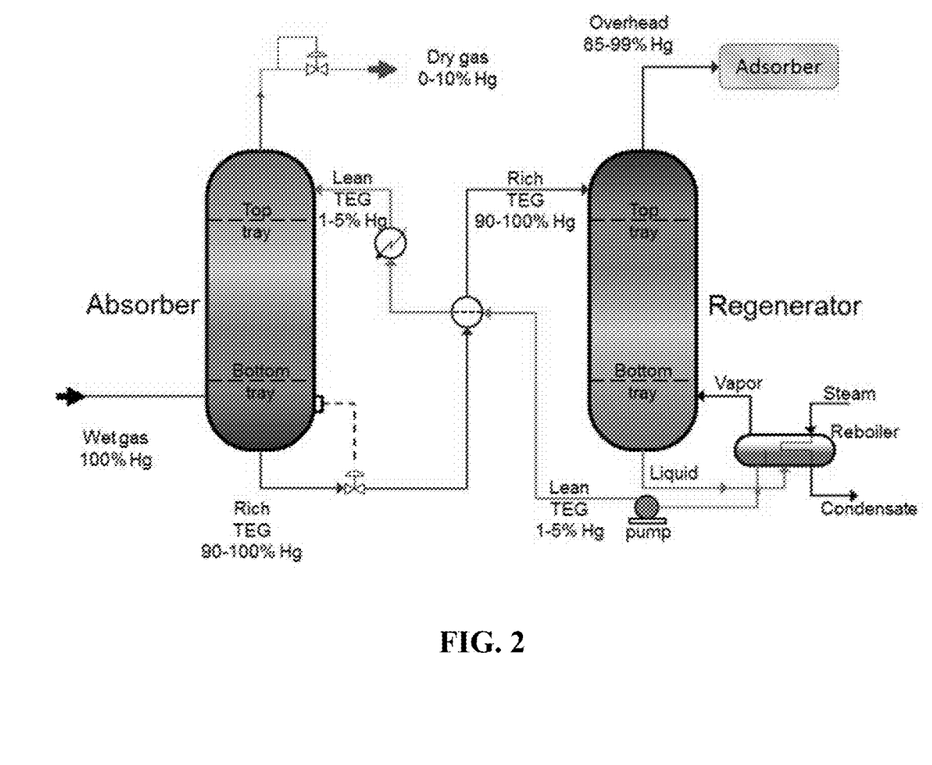
FIG. 2 is a diagram of a glycol dehydration process and system with overhead adsorber to remove volatile mercury.
Figure 5:
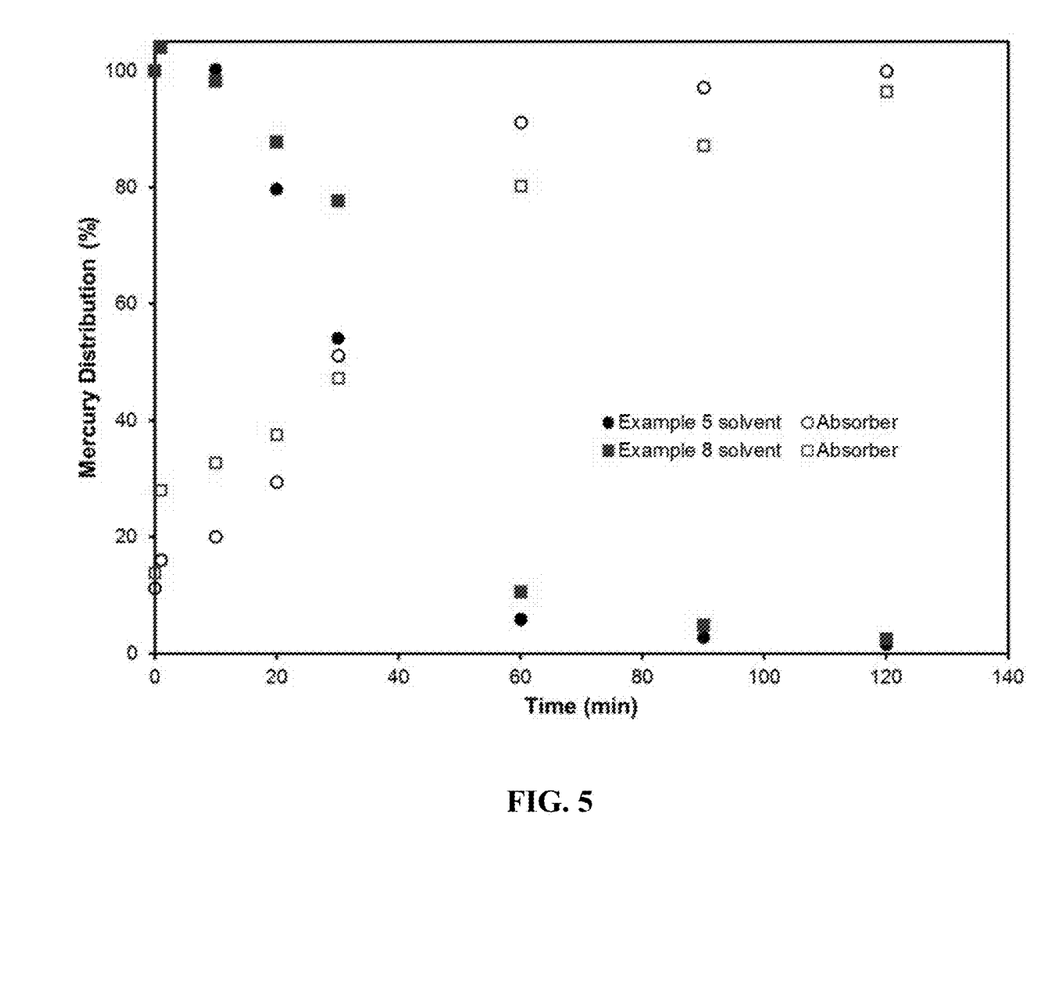
FIG. 5 is a graph of non-volatile mercury composition when treating Examples 5 and 8 at 200 degrees Celsius.

A three-neck flask with a Teflon stirrer containing 200 mL of rich glycol solvent containing the complexing agent and non-volatile mercury from Examples 5 or 8 is used in this example as a glass reactor. The three-neck flask is connected to a gas line with a flowing nitrogen carrier gas at a flowrate of 200 cc/min. The carrier gas connects to an absorber containing 3 wt % sodium polysulfide that acts as a capture agent for any volatile mercury that may evolve during the experiment. The flask is heated to 200 degrees Celsius to study the effects of the reboiler temperature on the non-volatile mercury species that have reacted with the complexing agent. These experiments are used to evaluate the thermal stability of non-volatile mercury in the rich glycol solvent after reacting with the complexing agent under various process conditions. The non-volatile mercury is shown in the attached FIG. 5 to decompose into a volatile mercury species when the rich glycol solvent is heated to temperatures used in the reboiler section of the dehydration process. It is expected that these overhead volatile mercury vapors will be carried out with the overhead water vapor. An adsorbent may be used to capture the mercury overhead vapors in this Example, using either activated carbon, alumina, silica, zeolite or supported metal, and a process and system for this is demonstrated in FIG. 2.

Example 10

A three-neck flask with a Teflon stirrer containing 200 mL of glycol solvent containing the complexing agent is used as a glass reactor for testing the thermal aging effect on the complexing agent. The glass reactor is connected to a gas line with flowing nitrogen carrier gas at a flowrate of 200 cc/min. The carrier gas provides a gas blanket on the reactor while the reactor is heated to 200 degrees Celsius. The glass reactor is attached to a condenser, which prevents the glycol solvent from boiling out of the reactor. The glycol solvent with the complexing agent is heated to 200 degrees Celsius for up to a period of 14 days without cooling. Upon cooling to room temperature, the glycol solvent with complexing agent is transferred to a different glass reactor and then tested as in Examples 2-8 for the efficiency of mercury removal. Upon heating for up to 7 days continuously at 200 degrees Celsius, the recovered glycol solvent has a mercury removal efficiency of 15% with a complexing composition equal to that used in Example 5. The effect of heating lowers the removal efficiency, but is still 15-fold higher than that of the glycol solvent with no complexing agent. It is expected that this complexing agent has reached a thermodynamic equilibrium after a short heating time, providing a stable efficiency removal at 15%. In Examples 9 and 10, the process would be operated by the scheme presented in FIG. 2.

Examples 11-14

Figure 3:
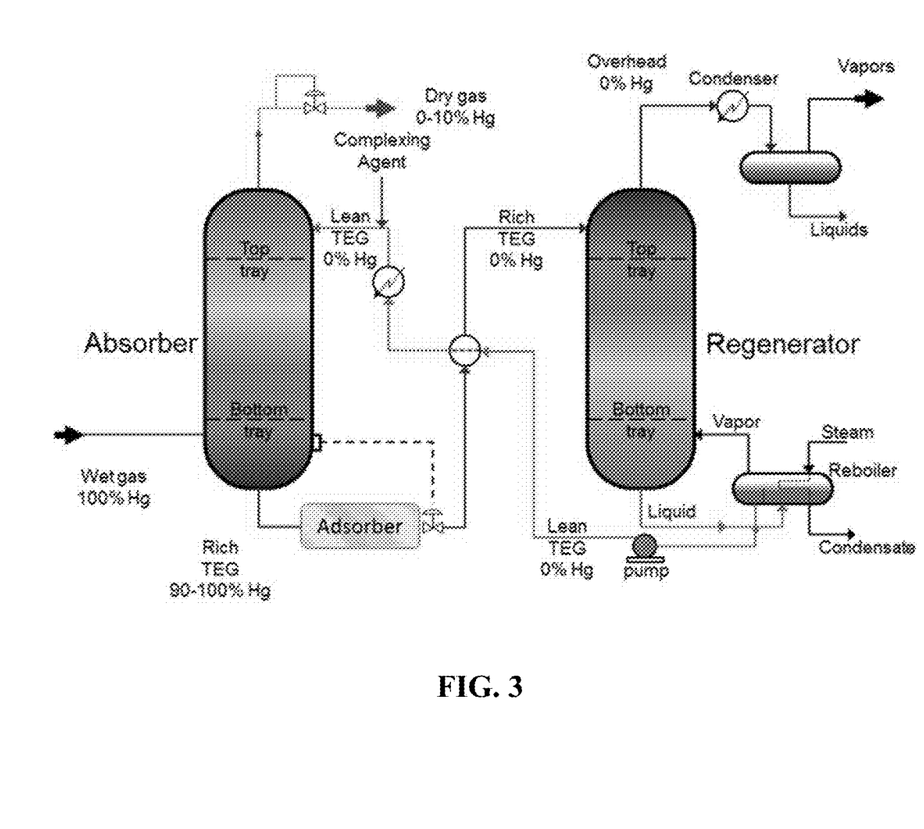
FIG. 3 is a diagram of a glycol dehydration process and system with rich glycol adsorber to remove mercury and partially remove complexing agent.
Figure 4:
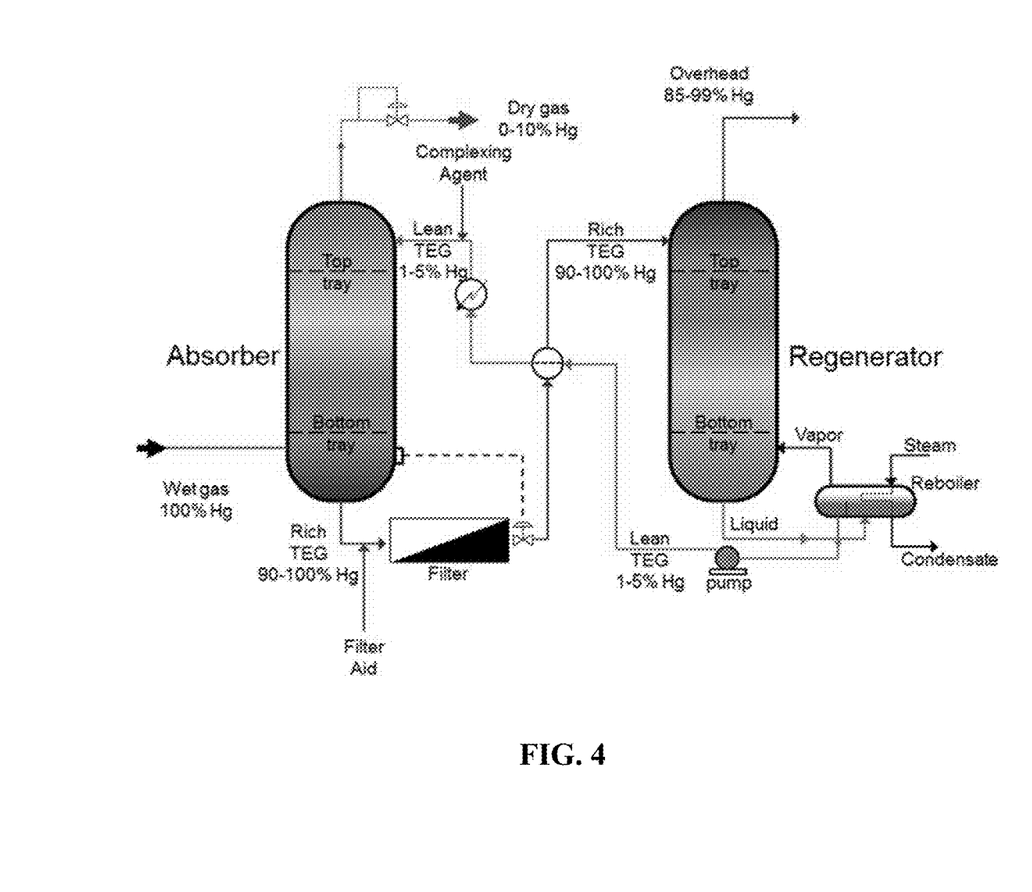
FIG. 4 is glycol dehydration process and system with rich glycol filter to remove mercury and partially remove complexing agent using filter aid.

Instead of allowing the complexing agent to continuously recirculate with the glycol solvent in the dehydration process, the complexing agent, sodium polysulfide, and non-volatile mercury may be removed by an adsorber as drawn in FIG. 3. A glycol solvent containing the complexing agent in the same concentration as Example 5 was prepared and contacted with multiple adsorbent materials to prove the concept of polysulfide removal using an adsorber. The total sulfur removal amount and sulfur capacity was determined by mass balance of sulfur before and after contact with the adsorber, and sulfur concentration was determined by a Mitsubishi Total Sulfur analyzer. Table 2 demonstrates that an adsorbent may remove sodium polysulfide with sufficient removal efficiency and capacity. In Table 2, the best adsorbent materials proved to be an activated carbon adsorbent with high surface area and pore volume. In particular, Nuchar WV B-1500 activated carbon has a BET surface area of 2190 m2/g and a total pore volume of 1.49 cm3/g.

TABLE 2

Examples 11-14.

| Example | Adsorbent | Sulfur Feed Concentration (ppm) | Glycol:Adsorbent Ratio (g:g) | Sulfur Removal Efficiency (%) | Sulfur Capacity (wt %) |
|---|---|---|---|---|---|
| 11 | Nuchar WV B-1500 | 1400 | 10:1 | 55 | 1.57 |
| 12 | Calgon BG-HHM | 1400 | 10:1 | 50 | 1.43 |
| 13 | Calgon APA | 1400 | 10:1 | 73 | 2.10 |
| 14 | General Carbon Sulfursorb-8 | 1400 | 10:1 | 42 | 1.22 |

Examples 15-18

In addition to removing the complexing agent by using an adsorber as drawn in FIG. 3, the non-volatile mercury species must also be removed in the adsorption process. A glycol solvent containing the complexing agent and non-volatile mercury in the same concentration as Example 5 was prepared and contacted with multiple adsorbent materials to prove the concept of non-volatile mercury removal using an adsorber. The total mercury removal amount and mercury capacity was determined by mass balance of mercury before and after contact with the adsorber, and mercury concentration was determined by a Lumex analyzer. Table 3 demonstrates that an adsorbent may effectively remove non-volatile mercury species that have reacted with the complexing agent and are fixed in the glycol solvent. In Table 3, the best adsorbent materials proved to be an adsorbent with either a supported metal in Example 18, a sulfided copper species on a clay support, or an activated carbon with high surface area and pore volume in Example 15.

TABLE 3

Examples 15-18.

| Example | Adsorbent | Non-volatile Mercury Feed Concentration (ppb) | Glycol:Adsorbent Ratio (g:g) | Mercury Removal Efficiency (%) | Mercury Capacity (ug/g) |
|---|---|---|---|---|---|
| 15 | Nuchar WV B-1500 | 1000 | 10:1 | 91 | 9.0 |
| 16 | Calgon APA | 1000 | 10:1 | 78 | 7.7 |
| 17 | Sulfided Cu/Al2O3 | 1000 | 10:1 | 60 | 6.1 |
| 18 | Sulfided Cu/Clay | 1000 | 10:1 | 81 | 8.0 |

Example 19

A sulfur-containing polymer, Nalmet, was obtained from NALCO and tested for mercury capture in triethylene glycol. In a three-neck flask reactor, mercury vapor was generated according to Example 1. Nalmet captured 40% of mercury generated with the remaining mercury ending up in the sodium polysulfide scrubbing solution.

What is claimed is:

1. A process for removal of mercury in a gas dehydration system comprising (a) adding a complexing agent to a recirculated glycol solvent as part of the glycol solution feed to the dehydration liquid contactor and recirculating continuously with the glycol solvent, (b) selectively reacting the complexing agent with mercury in the wet natural gas to remove the mercury from the dry natural gas product, (c) and feeding the rich glycol with the complexing agent to a regenerator and continuously regenerating.

2. The process of claim 1, wherein the overhead of the regenerator containing water and mercury vapor is contacted with an adsorbent that captures mercury.

3. The process of claim 2, wherein the adsorbent is selected from the group consisting of activated carbon, alumina, silica, zeolite or supported metal.

4. The process of claim 2, wherein a stripping gas is used to increase removal of both mercury and water vapor in the regenerator.

5. A process for removal of mercury in a gas dehydration system comprising (a) adding a complexing agent continuously prior to a liquid contactor, wherein inside the liquid contactor, the complexing agent dissolved in the lean glycol solvent selectively reacts with the mercury in the natural gas, producing a rich glycol solvent containing mercury, (b) and the rich glycol solvent is then sent to an adsorber where mercury and the complexing agent are removed using an adsorbent.

6. The process of claim 4 wherein the adsorbent is selected from the group consisting of activated carbon, ion-exchange resin, alumina, silica, zeolite or supported metal.

7. The process of claim 5 wherein the rich glycol with reduced complexing agent and no mercury is fed to a regenerator to remove water in the overhead and regenerate the glycol solvent.

8. The process of claim 4 wherein a filter aid is then added after the liquid contactor, but prior to the expansion valve.

9. The process of claim 7 wherein the filter aid is a mechanical filter, carbon filter, ultrafiltration filter or nanofiltration filter.

* * * * *